2,861,109
POLY-UNSATURATED ACYCLIC DI-ETHERS

August Sturzenegger, Clifton, N. J., assignor to Hoffmann-La Roche Inc., Nutley, N. J., a corporation of New Jersey No Drawing. Application December 11, 1956
Serial No. 627,571

5 Claims. (Cl. 260—615)

This invention relates to novel chemical compounds and to novel processes of making them. More particularly, the invention relates to novel acyclic di-ethers, useful as odorants for perfumes and the like, and to methods of making said novel compounds.

The acyclic di-ethers referred to above can be characterized generically as compounds having the formula (I) 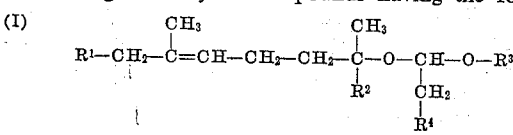

wherein $R^1$ represents a member selected from the group consisting of hydrogen and lower alkyl radicals, $R^2$ represents the ethinyl radical, $R^3$ represents a lower alkyl radical, and $R^4$ represents a member selected from the group consisting of hydrogen and lower alkyl radicals.

One general process of making compounds represented by the above Formula I comprises condensing a compound having the formula (II) 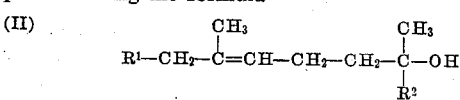

wherein $R^1$ represents a member selected from the group consisting of hydrogen and lower alkyl radicals, and $R^2$ represents the ethinyl radical, with a compound having the formula (III) 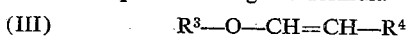

wherein $R^3$ represents a lower alkyl radical, and $R^4$ represents a member selected from the group consisting of hydrogen and lower alkyl radicals, in the presence of an acidic condensing agent. Suitable acidic condensing agents include p-toluenesulfonic acid and boron tri-fluoride; other equivalent acidic condensation agents can be employed. The condensation reaction is conveniently effected by mixing Compound II with Compound III in the presence of the acidic condensing agent. The reaction is exothermic, and it is ordinarily desirable to cool the reaction mixture so that the temperature of the reaction does not exceed room temperature; preferably, reaction temperatures between about 0° C. and about 15° C. are employed. An inert diluent, preferably a solvent for both reactants, can be employed if desired; but its use is not mandatory. The inclusion of stabilizing agents in the reaction mixture is also optional.

The novel products of the invention represented by the above Formula I are useful as odor-imparting materials in the preparation of perfumes and of scented compositions generally. These compounds of the invention possess characteristic pleasant odors, which can be characterized generally as being reminiscent of cardamon and hydroxycitronellal.

The invention includes compounds which can be designated by the nomenclature: 1-(lower alkoxy)-1-(higher alkenynyloxy)-lower alkane. Particularly preferred within this subgenus are those products made by condensing a higher 6-alken-1-yn-3-ol (e. g. 3,7-dimethyl-6-octen-1-yn-3-ol, 3,7-dimethyl-6-nonen-1-yn-3-ol, and 3,7,9-trimethyl-6-decen-1-yn-3-ol) with a lower alkyl 1-alkenyl ether having from 2 to 4 carbon atoms in the alkenyl radical (e. g. ethyl vinyl ether, methyl vinyl ether, ethyl 1-propenyl ether, ethyl 1-butenyl ether, and the like); such products can be designated by the nomenclature: 1-(lower alkoxy)-1-(higher 6-alken-1-yn-3-yloxy)-lower alkane.

The invention is further disclosed in the following examples, which are illustrative but not limitative thereof. All temperatures are stated in degrees centigrade, uncorrected.

Example 1

To 76 g. (0.5 mol) of 3,7-dimethyl-6-octen-1-yn-3-ol was added 10 mg. of p-toluenesulfonic acid, and also 5 mg. of 2,5-di-(tert.-butyl)-hydroquinone as stabilizer. To this mixture was rapidly added, while stirring, 36 g. (0.5 mol) of ethyl vinyl ether. The reaction mixture was stirred for three hours, while cooling to maintain the temperature between 5° and 10°. Then 300 ml. of petroleum ether was added, and the p-toluenesulfonic acid was neutralized by careful addition of sodium methoxide. The mixture was washed twice, each time with 200 ml. of water, dried over anhydrous sodium sulfate; and then was fractionated under reduced pressure. The product, 1 - ethoxy-1-(3,7-dimethyl-6-octen-1-yn-3-yloxy)-ethane, was obtained in a fraction having B. P. 71°–73°/0.5 mm. and $n_D^{25}=1.4466$–$1.4478$.

Example 2

34.8 g. (0.6 mol) of liquefied methyl vinyl ether was added rapidly to a stirred mixture of 91.2 g. (0.6 mol) of 3,7-dimethyl-6-octen-1-yn-3-ol and 7 mg. of p-toluenesulfonic acid, previously cooled to a temperature of minus 15°. The mixture was stirred for four hours while maintaining the temperature between minus 10° and 0°. Then 300 ml. of diethyl ether was added and the p-toluenesulfonic acid was neutralized with sodium methoxide. The reaction mixture was washed twice, each time with 200 ml. of water, the diethyl ether was flashed off, and the residue was fractionated under reduced pressure. There was thus obtained 1-methoxy-1-(3,7-dimethyl-6-octen-1-yn-3-yloxy)-ethane, B. P. 72°–74°/1.3 mm.,
$$n_D^{25}=1.4476–1.4484.$$

Example 3

50 g. (0.5 mol) of isobutyl vinyl ether and 76 g. (0.5 mol) of 3,7-dimethyl-6-octen-1-yn-3-ol were reacted in the presence of 30 mg. of p-toluenesulfonic acid, in the manner described in Example 2, and worked up as described in that example. There was thus obtained 1-isobutoxy-1-(3,7-dimethyl-6-octen-1-yn-3-yloxy)-ethane, having B. P. 95°–98°/1.6 mm., $n_D^{25}=1.4450$–$1.4455$.

Example 4

In similar manner to Example 3, by condensing half gram-molar quantities of ether and alcohol, there was obtained, from n-butyl vinyl ether and 3,7-dimethyl-6-octen-1-yn-3-ol: 1 - n - butoxy-1-(3,7-dimethyl-6-octen-1-yn-3-yloxy)-ethane, having B. P. 94°–96°/1.0 mm., $n_D^{25}=1.4492$–$1.4500$.

Example 5

In similar manner to Example 3, by condensing half gram-molar quantities of ether and alcohol, there was obtained, from ethyl vinyl ether and 3,7-dimethyl-6-nonen-1-yn-3-ol: 1-ethoxy-1-(3,7-dimethyl-6-nonen-1-yn-3 - yloxy)-ethane, having B. P. 87°–90°/1.2 mm., $n_D^{25}=1.4499$–$1.4506$. The starting material, 3,7-dimethyl-6-nonen-1-yn-3-ol, can be made, for example, by the following method:

600 g. of 3-methyl-1-penten-3-ol was cooled to +15° with an ice bath, then 1800 ml. of concentrated aqueous hydrochloric acid (containing 37% by weight HCl) was poured into the reaction vessel. The mixture was stirred for 30 minutes. The oil, comprising essentially 1-chloro-3-methyl-2-pentene, was separated, washed three times with 500 ml. of water and dried over calcium chloride.

Four liters of benzene, 1040 g. of ethyl acetoacetate and 378 g. of sodium methylate were stirred into a 12 liter flask. 696 g. of 1-chloro-3-methyl-2-pentene as produced in the preceding paragraph was added from a separatory funnel in two hours at 60°. The stirring was then continued at 60° overnight.

The mixture was diluted with four liters of water. The oil was separated and the benzene was distilled off under vacuum. The thick residue, 3-carbethoxy-6-methyl-5-octen-2-one, was placed in a 5 liter flask with 2 liters of ethyl alcohol, 1 liter of water and 500 grams of potassium hydroxide. This was stirred for two hours, then allowed to set overnight, thereby forming the potassium salt of 3-carboxy-6-methyl-5-octen-2-one.

Concentrated hydrochloric acid was added to the stirred reaction mixture from a separatory funnel until strongly acid. The oil layer was removed, and the aqueous portion was extracted with one liter of benzene. The combined oils were water washed and fractionated to yield 6-methyl-5-octen-2-one, distilling at 65°/10 mm., $$n_D^{25}=1.4412.$$

84 g. of metallic sodium was dissolved in 3 liters of liquid ammonia. Acetylene was bubbled into the stirred solution until its color changed from blue to white. 420 g. of 6-methyl-5-octen-2-one was dissolved in 500 ml. of diethyl ether and dropped into the stirred reaction mixture in one hour. Stirring was then continued for three hours while a slow stream of acetylene was bubbled in. The acetylene was then stopped, but the stirring was continued for about 15 hours. The ammonia was then distilled off and the residue in the reaction vessel was washed with 2 liters of 5% aqueous sulfuric acid. The product was then water washed, dried over anhydrous calcium sulfate and fractionated to yield 3,7-dimethyl-6-nonen-1-yn-3-ol, distilling at 89°/10 mm., $n_D^{25}=1.4612$.

*Example 6*

In similar manner to Example 3, by condensing half gram-molar quantities of ether and alcohol, there was obtained, from ethyl vinyl ether and 3,7,9-trimethyl-6-decen-1-yn-3-ol: 1 - ethoxy-1-(3,7,9-trimethyl-6-decen-1-yn-3-yloxy)-ethane. The starting material, 3,7,9-trimethyl-6-decen-1-yn-3-ol, can be made, for example, by the following method:

438 grams of 3,5-dimethyl-1-hexen-3-ol was stirred with 1500 ml. of concentrated aqueous hydrochloric acid (containing 37% by weight HCl) at room temperature for 30 minutes. The oil layer was separated, washed twice, each time with 500 ml. of water, and dried over calcium chloride. The product obtained, 1-chloro-3,5-dimethyl-2-hexene, had $n_D^{25}=1.448$.

In a five-liter flask there was placed 3 liters of benzene, 429 g. of ethyl acetoacetate and 162 g. of sodium methylate. 428 g. of the product of the preceding paragraph, 1-chloro-3,5-dimethyl-2-hexene, was added at 60° within 30 minutes, and stirring was continued for six hours at 60°–70°. The reaction mixture was washed with 2 liters of water and the benzene was distilled off under a vacuum of 100 mm. to yield 3-carbethoxy-6,8-dimethyl-5-nonen-2-one as a straw-colored oil.

The entire quantity of 3-carbethoxy-6,8-dimethyl-5-nonen-2-one produced above was dissolved in 2 liters of ethyl alcohol. To this was added 200 g. of solid potassium hydroxide and 200 ml. of water. The mixture was stirred for four hours at 40°–50°. To the resulting solution of the potassium salt of 3-carboxy-6,8-dimethyl-5-nonen-2-one was then added concentrated aqueous hydrochloric acid (containing 37% by weight HCl) from a separatory funnel until the solution was strongly acid. Thirty minutes were required for the addition. The solution was then stirred an additional hour at 50°.

The reaction mixture was diluted with 2 liters of water and the oil layer was removed by means of a separatory funnel. The aqueous portion was extracted with 500 ml. of benzene. The combined oils were washed neutral with water and fractionated. The product 6,8-dimethyl-5-nonen-2-one distilled at 120°/35 mm., $n_D^{25}=1.4432$.

In 1.5 liters of liquid ammonia there was dissolved 41.4 g. of metallic sodium. Acetylene gas was passed into the blue colored solution, until the color changed to white. The addition of acetylene was continued for an extra 30 minutes. Then a solution of 252 grams of 6,8-dimethyl-5-nonen-2-one, dissolved in 250 ml. of ethyl ether, was dropped in within 45 minutes. The stirring was continued for 15 hours while a slow stream of acetylene was bubbled into the reaction mixture. The ammonia was thereupon evaporated from the reaction mixture with the aid of a slow stream of nitrogen. The residue was poured into two liters of 5% sulfuric acid. The oil layer was removed and washed neutral with water. On fractionation, 3,7,9-trimethyl-6-decen-1-yn-3-ol was obtained in a fraction distilling at 72°/0.35 mm., $n_D^{25}=1.4598$.

*Example 7*

To 91.2 g. of 3,7-dimethyl-6-octen-1-yn-3-ol was added 10 mg. of p-toluenesulfonic acid. The mixture was cooled to 0°, and while stirring, 51.7 g. of ethyl 1-propenyl ether was added rapidly. The mixture was stirred for four hours at 0° to 10°, and was then diluted with 300 ml. of diethyl ether. The catalyst was neutralized by careful addition of sodium methoxide. Then the reaction mixture was washed to neutrality with two 200 ml. portions of water. The solvent was flashed off and the residue was fractionated under reduced pressure. The product, 1-ethoxy-1-(3,7-dimethyl-6-octen-1-yn-3-yloxy)-propane, was obtained in a fraction having B. P. 85°–86°/1.0 mm., $n_D^{25}=1.4471$–$1.4472$.

I claim:

1. A compound having the formula

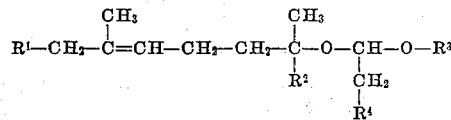

wherein $R^1$ represents a member selected from the group consisting of hydrogen and lower alkyl radicals, $R^2$ represents the ethinyl radical, $R^3$ represents a lower alkyl radical, and $R^4$ represents a member selected from the group consisting of hydrogen and lower alkyl radicals.

2. 1-(lower alkoxy)-1-(3,7 - dimethyl-6-octen-1-yn-3-yloxy)-ethane.

3. 1-(lower alkoxy)-1-(3,7-dimethyl-6-nonen-1-yn-3-yloxy)-ethane.

4. 1-(lower alkoxy)-1-(3,7,9-trimethyl-6-decen-1-yn-3-yloxy)-ethane.

5. 1-(lower alkoxy)-1-(3,7 - dimethyl-6-octen-1-yn-3-yloxy)-propane.

References Cited in the file of this patent
UNITED STATES PATENTS 2,042,219    Groll et al. _____ May 26, 1936
2,253,342    Mikeska et al. _____ Aug. 19, 1941

OTHER REFERENCES

West et al.: Synthetic Perfumes (1949), pp. 22, 251.
Lindlar: Helvetica Chemica Acta, vol. 35 (1952), p. 450.
Wagner et al.: Synthetic Organic Chemistry (1953), pp. 232, 233.
Tsuji et al.: Chem. Abs., vol. 48 (1954), p. 14134(a).